July 12, 1938.  A. L. BALL  2,123,705
APPARATUS FOR CUTTING HARD SUBSTANCES
Filed Oct. 4, 1934
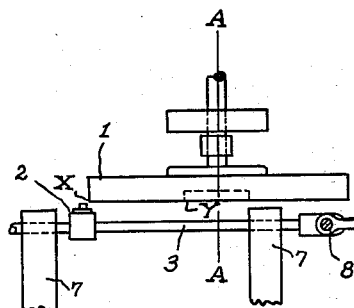
Fig. 1
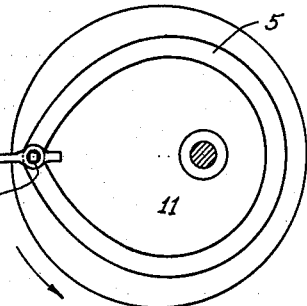
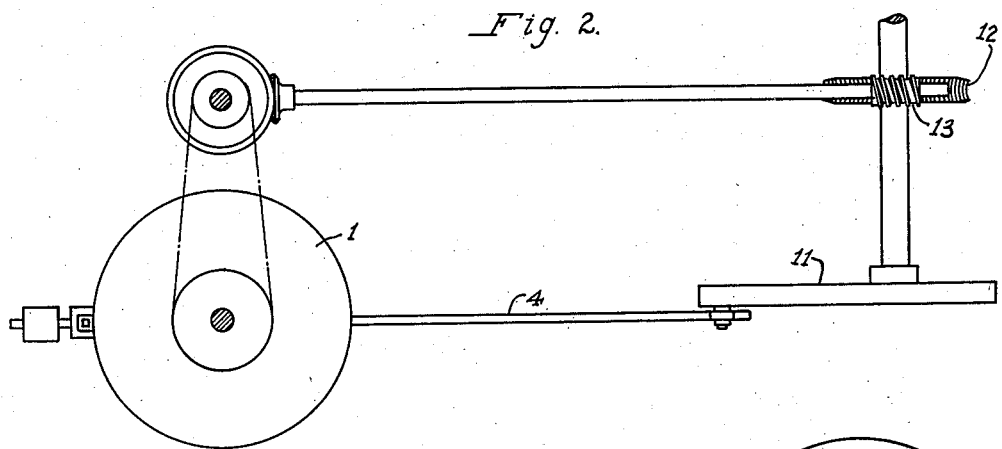
Fig. 2
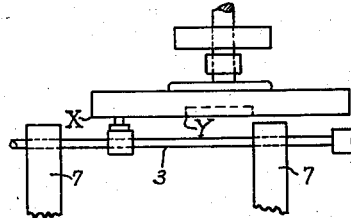
Fig. 3
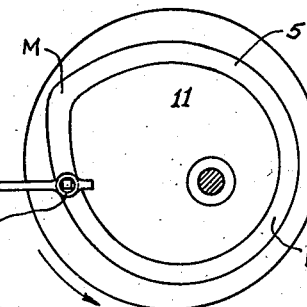
INVENTOR.
ALBERT L. BALL
BY *R C Benner*
ATTORNEY.

Patented July 12, 1938

2,123,705

UNITED STATES PATENT OFFICE 2,123,705

APPARATUS FOR CUTTING HARD SUBSTANCES

Albert L. Ball, Lewiston Heights, N. Y., assignor, by mesne assignments, to The Carborundum Company, Niagara Falls, N. Y., a corporation of Delaware Application October 4, 1934, Serial No. 746,797

2 Claims. (Cl. 51—122)

This invention relates to cutting or grinding apparatus and to methods of performing cutting or grinding operations with such apparatus. More particularly the invention relates to cutting or grinding operations in which both the tool and the work piece are composed of extremely hard material.

As an illustration of the difficulties which are met with in the last-mentioned class of operations, the use of diamond wheels for cutting very hard materials may be cited. The ordinary method of forming facets on diamonds has involved moving the diamond back and forth on lapping surfaces which are covered with a small supply of liquid charged with diamond dust. This method has proved to be extremely tedious. Its success has depended on the skill and patience of the operator. According to the present invention an operation of this kind is carried out by means of a rotary abrasive body in which diamonds of small dimensions (with or without other abrasive material) are rigidly bonded to form a wheel, one of whose lateral surfaces is used for cutting. The diamond which is being processed is moved back and forth over the lateral surface of the abrasive wheel in such a manner as to produce as uniform wear as possible on the cutting surface. If the diamond which is being processed were held in a fixed position grooves would be worn in the abrasive wheel. These grooved abrasive surfaces would tend to prevent the formation of plane surfaces on the diamond under treatment.

As an example of a composition which can be used in the manufacture of an abrasive wheel suitable for cutting diamonds, hard cemented carbides and the like, the following constituents are mentioned:

| | Percent |
|---|---|
| Diamonds—80 to 220 grit (meshes to the linear inch) | 10 |
| Fused alumina—80 to 200 grit | 22 |
| Potentially reactive synthetic resin | 12 |
| Heat hardened synthetic resin in pulverized form | 56 |

A mixture is made of these materials, the potentially reactive synthetic resin being used as a plasticizer. The mixture is molded into the form of a wheel and heat hardened while under pressure. The finished wheel is mounted for rotation about an axis.

The work piece may be, as suggested above, a diamond which is to be provided with one or more plane faces, or the work piece may be composed of tungsten carbide, or of tantalum carbide, or of other very hard cutting or grinding material cemented by means of a metal such as cobalt. The work piece is mounted in a convenient holder by means used by those skilled in the art of mounting hard, brittle articles.

The method of reciprocating the work piece is illustrated by means of the accompanying drawing in which:

Figure 1 is a plan view of the apparatus employed in cutting or grinding a work piece of very hard material including cam actuating means for producing a reciprocating motion;

Figure 2 is a side elevation of the same apparatus; and

Figure 3 shows the cam and cam follower in an intermediate position.

Referring to the drawing in detail, an abrasive wheel 1 of composition similar to that mentioned in the example given above is rotated about a fixed axis A—A. The work piece 2 is mounted on a slide 3 which is adapted to be reciprocated in guides 7. The arm 4 is clamped to the slide 3 by means of adjustable clamping means indicated at 8. The arm 4 carries a roller 9 which contacts with the sides of the cam groove 5 which is formed in a member 11. This member 11 is mounted on a worm gear 12 which is turned slowly by means of a worm 13. The mechanical movement just described moves the work piece 2 back and forth in a direction passing through the axis A—A and perpendicular thereto, while the contacting surface of the wheel 1 is rotated rapidly about its axis. The surface which is being cut or ground therefore moves in a complicated path over the working surface of the abrasive wheel 1. The grooved cam 5 is designed to make the speed of the work piece 2 approximately constant (except near the two points of reversal) when the abrasive wheel is run at constant speed. Thus when the work piece 2 is near the outer edge or periphery of the abrasive surface (denoted by X in Figure 1) the work piece has to be reversed rapidly to prevent making a long groove at or near the periphery. The cam groove is therefore shaped at the end marked M in such a manner as to produce a rapid reversal of the direction of motion of the work piece 2. As noted above, the reciprocatory movement is in a direction radial to the rotating surface of the wheel. It is not so necessary to make as rapid a reversal of the direction of motion of the work piece 2 near the inner edge of the abrasive surface (marked Y in Figure 1) since this edge is rotating at a lower peripheral velocity.

During the movement between the edges Y and X it is desirable that the speed of the work piece 2 should be proportional to the angular velocity of the wheel surface with which the work piece contacts. If $r$ be the radial distance of the work piece from the axis of rotation of the grinding surface and $\theta$ the angular position of the grinding surface at any instant, the condition just mentioned requires that $$\frac{dr}{dt} \text{ be proportional to } \frac{d\theta}{dt}$$

where $$\frac{dr}{dt}$$

is the speed of reciprocation of the work piece at any instant and $$\frac{d\theta}{dt}$$

is the angular velocity of the abrasive surface with which the work piece is in contact.

$$\frac{d\theta}{dt}$$

represents therefore the angular velocity of the abrasive wheel in radians per second. When the angular speed is kept constant, the above proportionality makes the speed of the work piece 2 constant. This last condition can be approximately met when the work piece is not near its reversal points X and Y. The reciprocating movement described can be carried out with the aid of a cam groove whose principal curve is represented by the equation in polar coordinates:

(1) $\qquad R = K\theta + B$ where R is the distance of a point in the cam curve from the axis of rotation of the cam, $\theta$ is the angular position of the cam at a given instant, the constant K is equal to the rate of change of radial distance $$\frac{dR}{dt}$$

divided by the angular speed of the cam $$\frac{d\theta}{dt}$$

and B is the smallest value of R. The Equation (1) represents a spiral of Archimedes. Each half of the cam groove shown in Figure 1 has this general shape except near the two opposite points M and N which cause reversal of the work piece. At the opposite ends of the cam (M and N) the cam is rounded off to give a sharper curvature at M which causes the reversal of the tool 2 near the outer edge of the wheel to be accomplished more rapidly than the reversal at N.

As a numerical example, the speed of the wheel 1 may be 3600 revolutions per minute, the outside diameter of the wheel 1 being 6 inches and the inside diameter 2 inches. The linear speed of the outside of the wheel is about 5660 feet per minute and the speed at the inside edge is about 1885 feet per minute. The cam can be geared to the wheel to give 60 complete reciprocations per minute or a linear speed of about 40 feet per minute.

If the reciprocatory motion of the work piece 2 were simple harmonic the maximum speed of the tool would occur half way between the reversal points X and Y. In this case the lateral abrasive surface of the wheel would wear to a comparatively slight extent in the middle portion, that is nearly half way between X and Y, while the outer edge of the wheel would be considerably cupped as mentioned above. One of the principal objects of the present invention is to produce an even rate of wear over the main portion of the abrasive surface intermediate between the radial positions X and Y.

It is not necessary that the abrasive surface 1 should be rotated at constant speed. The abrasive surface and the cam can be rotated by means of the same motor so that the angular speed of the cam remains proportional to the angular speed of the abrasive surface. In this case the speed of the tool at points between X and Y is not necessarily constant but is kept proportional to the angular speed of the rotating abrasive surface, that is the angular speed of the wheel divided by the linear speed of reciprocation of the piece 2 is kept constant.

In the apparatus illustrated in the drawing and described in detail above, the relations of the members 1 and 2 are reversible, that is either one of these members may be the cutter while the other member is the object which is being cut. By virtue of this interchangeability my process or method becomes applicable to a large variety of substances. For example, if the element 1 is a metal, then the element 2 can be a tool made of steel or cemented tungsten carbide mounted on a carrier. If the member 1 has a cutting surface composed of many small cutting elements, such as particles of silicon carbide, fused alumina, boron carbide, diamond or mixtures of these, then the element 2 may be an object to be cut and consist of hard metal, mineral, gem, hard metallic carbide or the like.

The abrasive wheel disclosed in the present application has many advantages in the processing of very hard surfaces such as those bounding the cutting edges of tungsten carbide tools.

I claim:

1. Apparatus for grinding very hard substances and for distributing the wear of a grinding wheel with substantial uniformity over the major portion of the working surface of the wheel, said apparatus comprising an abrasive wheel having a flat annular grinding surface, a carrier mounted in fixed guides for supporting the work piece while it is reciprocated radially with respect to the working surface, a rotatable driving member having a cam groove consisting of two symmetrical branches, each of which is shaped similarly to an Archimedean spiral, and an arm adjustably connected at one end to said carrier and carrying at its opposite end a roller which is engaged by said cam groove, whereby the work piece is positively reciprocated with a substantially constant speed except near points of reversal.

2. Apparatus for grinding small surfaces of very hard material, said apparatus comprising an artificially bonded abrasive wheel adapted to grind by means of a flat lateral surface, a carrier for the work piece mounted for sliding movement in one or more fixed standards so that the workpiece moves in contact with the lateral surface of said wheel toward and from the axis of rotation of said wheel, a cam groove mounted on another rotatable member which has its axis of rotation perpendicular to that of the abrasive wheel, said cam groove having a bilateral configuration in which the major portion of each half groove has the shape of an Archimedean spiral and in which the axis of rotation of the cam passes through the common axis of said spirals, and a connecting rod attached to said carrier at one end and attached at the other end to a roller which engages the sides of the cam groove whereby the workpiece is moved back and forth at constant speed except near points of reversal.

ALBERT L. BALL.